(12) United States Patent
Cristadoro et al.

(10) Patent No.: US 8,436,125 B2
(45) Date of Patent: May 7, 2013

(54) MATERIALS, METHODS FOR PRODUCTION THEREOF AND COMPONENTS THEREOF

(75) Inventors: Anna Cristadoro, Heppenheim (DE); Bernd Bruchmann, Freinsheim (DE); Anna Thome, Langwiesen (CH); Juergen Widler, Hilzingen (DE)

(73) Assignee: BASF SE, Ludwigshafen (DE)

( * ) Notice: Subject to any disclaimer, the term of this patent is extended or adjusted under 35 U.S.C. 154(b) by 9 days.

(21) Appl. No.: 13/114,480

(22) Filed: May 24, 2011

(65) Prior Publication Data

US 2011/0294929 A1  Dec. 1, 2011

Related U.S. Application Data

(60) Provisional application No. 61/348,748, filed on May 27, 2010.

(51) Int. Cl.
| | | |
|---|---|---|
| *C08G 18/06* | (2006.01) | |
| *C08F 8/30* | (2006.01) | |
| *C08L 75/04* | (2006.01) | |
| *C08L 21/00* | (2006.01) | |
| *C08L 79/08* | (2006.01) | |

(52) U.S. Cl.
USPC ............ 528/60; 528/59; 525/123; 525/127

(58) Field of Classification Search ............ 525/123, 525/127; 528/59, 60
See application file for complete search history.

(56) References Cited

U.S. PATENT DOCUMENTS

| | | | |
|---|---|---|---|
| 2,155,687 A | 4/1939 | Schauer | |
| 3,277,117 A | 10/1966 | Van Strien et al. | |
| 3,314,923 A | 4/1967 | Muller et al. | |
| 4,177,333 A | 12/1979 | Riccitiello et al. | |
| 4,614,782 A | 9/1986 | Nishizawa et al. | |
| 4,820,580 A | 4/1989 | Hocker et al. | |
| 6,096,817 A | 8/2000 | Mc Namara | |
| 7,686,030 B2 | 3/2010 | Furuya et al. | |
| 7,825,198 B2 | 11/2010 | Arima et al. | |

FOREIGN PATENT DOCUMENTS

| | | |
|---|---|---|
| DE | 32 13 257 A1 | 11/1982 |
| EP | 0 286 966 A2 | 10/1988 |
| EP | 1 516 720 A1 | 3/2005 |
| GB | 1 227 446 | 4/1971 |
| JP | 54-146895 | 11/1979 |
| JP | 2005-179575 | 7/2005 |
| JP | 2006-70715 | 3/2006 |
| JP | 2008-41808 | 2/2008 |
| WO | WO 99/00453 A1 | 1/1999 |
| WO | WO 2005/095517 A1 | 10/2005 |
| WO | WO 2007/047073 A2 | 4/2007 |
| WO | WO 2007/141171 A1 | 12/2007 |

OTHER PUBLICATIONS

International Search Report issued Sep. 6, 2011 in PCT/EP2011/058032 (with English Translation).
U.S. Appl. No. 13/440,463, filed Apr. 5, 2012, Henningsen, et al.

*Primary Examiner* — Kriellion Sanders
(74) *Attorney, Agent, or Firm* — Oblon, Spivak, McClelland, Maier & Neustadt, L.L.P.

(57) ABSTRACT

The present invention relates to materials comprising
(A) at least one rubber,
(B) at least one polyimide selected from branched condensation products of
(a) at least one polyisocyanate having on average more than two isocyanate groups per molecule, and
(b) at least one polycarboxylic acid having at least 3 COOH groups per molecule or anhydride thereof.

16 Claims, No Drawings

MATERIALS, METHODS FOR PRODUCTION THEREOF AND COMPONENTS THEREOF

This patent application claims the benefit of pending U.S. provisional patent application Ser. No. 61/348,748 filed May 27, 2010, incorporated in its entirety herein by reference.

Materials, methods for production thereof and components therefor

The present invention relates to materials comprising
(A) at least one rubber,
(B) at least one polyimide, selected from branched condensation products of
   (a) at least one polyisocyanate having on average more than two isocyanate groups per molecule and
   (b) at least one polycarboxylic acid having at least 3 COOH groups per molecule or anhydride thereof, and
(C) optionally at least one polyurethane.

In addition, the present invention relates to a method for producing materials according to the invention. In addition, the present invention relates to polyimides, which are particularly suitable as a component of materials according to the invention, and to a method for producing polyimides according to the invention. In addition, the present invention relates to the use of polyimides according to the invention.

Natural and, in particular, synthetic rubbers are currently used in many applications, more precisely and preferably as rubber particles. An important field of application in this case is producing prefabricated elastic mats or molded parts, and also elastic sheets that are installed in situ, using rubber granules of varying sizes. In this case, optionally, different types of new rubber or recycled granules are used, wherein the latter are obtained by recycling car tires or by reprocessing industrial rubber wastes. Generally, the rubber granules are subsequently mixed with a defined amount of polyurethane as binder, and either pressed in molds or applied in situ, that is to say on site, as a sheet on a more or less planar surface. When prefabricated mats or molded parts are produced, small amounts of water and/or catalysts can be added to the granules before or after they are mixed with the binder, wherein the catalysts are customarily tertiary amines or metal complex compounds or metal salts. The curing finally proceeds by reacting the polyurethane with either the small amount o added water (in the case of molded parts) or else with the water fractions from the atmospheric humidity in the case of in situ installation. In any case, elastic composite materials are formed here. If the composite materials are prefabricated as cylindrical goods, these are cut to size using special machines to form elastic mats of an exactly defined thickness.

Such prefabricated or in situ fabricated elastic mats or sheets are used, for example, as protective layers, insulating layers, anti-slip mats and floors, as elastic sports floors in the indoor and outdoor sector, and also as protection against fall for children's playgrounds and as an elastic sheet under artificial lawns.

Depending on the type and origin of the rubber granules used, the mechanical properties of composite materials, both prefabricated and installed in situ, vary greatly. These differences are particularly pronounced in the case of recycled goods, and in particular in the case of recycled-rubber granules, since these generally have a very heterogeneous composition. For instance, just in the running surface of a vehicle tire, for example, in particular a truck tire, up to twenty different types of rubber can be present. Accordingly, highly varying properties are obtained which give cause to use a calculated minimum amount of PUR binder for assuring quality. Certain recycled granules are in principle not suitable for certain fields of application such as, for example, light athletic tracks, since important requirements of current standards with respect to tension and extension cannot be complied with thereby.

The adhesion of rubbers to other materials is in many cases good. Nevertheless, the requirements of adhesion of certain material combinations cannot always be achieved in demanding applications. Therefore, an improvement of the adhesion of rubbers to other materials is in many cases desirable for producing composite materials.

Known methods for improving adhesion comprise chemical and/or physical pretreatment of one or both of the boundary surfaces that are to be bound to one another. These include corona treatment, flame treatment, plasma treatment, UV-irradiation, sputtering, etching, and in addition electrochemical methods such as anodizing, or mechanical roughening processes. In addition, primers or adhesion promoters are applied in combination or separately to one or both boundary surfaces, which primers or adhesion promoters do not themselves cause any chemical or morphological change of the substrate surfaces, but act as adhesion promoters.

Thus, EP 0 286 966 discloses the plasma treatment of a rubber surface for improving adhesion to a polyurethane foam. The use of an adhesion promoter layer for improving adhesion between polyurethane and metal is described, for example, in EP 1 516 720.

The disadvantage of the known methods is that such processes are frequently additional production steps and lead to increased consumption of time and expenditure. In addition, handling solvent-comprising and/or aggressive substances can lead to stresses on humans and the environment.

However, in many cases it is desirable to increase further the adhesion of rubbers to other materials even after chemical and/or physical pretreatment.

WO 2007/141171 describes polyurethanes that are bound via a hyperbranched polymer to other finely distributed solids. Suitable hyperbranched polymers are selected, in particular, from polyethers, polyamines, polyesters, polycarbonates, polyamides, polyurethanes and polyureas, and also the mixed forms polyetheramines, polyesteramides, polyamidoamines, polyester carbonates and polyureas urethanes.

In particular, the binding of polyurethanes to rubbers cannot be improved, however. In addition, the above-described method is very laborious.

The object was therefore to provide materials in which particularly strong bonding of rubber to polyurethane, or vice versa, can be effected.

Accordingly, the materials defined at the outset have been found. Materials according to the invention comprise
(A) at least one rubber, also termed rubber (A),
(B) at least one polyimide, also termed polyimide (B), selected from branched condensation products of
   (a) at least one polyisocyanate having on average more than two isocyanate groups per molecule, termed polyisocyanate (a) for short, and
   (b) at least one polycarboxylic acid having at least 3 COOH groups per molecule, termed polycarboxylic acid (b) for short, or anhydride thereof, termed anhydride (b) for short, and
(C) optionally at least one polyurethane, also polyurethane (C).

Materials according to the invention comprise at least one rubber (A). In the context of the present invention, rubber (A) can be selected from any elastomers including thermoplastic elastomers. Suitable elastomers are, for example, butadiene rubber (BR), styrene butadiene rubber (SBR), isoprene rubber (IR), styrene isoprene butadiene rubber (SIBR), acrylonitrile butadiene rubber (NBR), chloroprene rubber (CR), isobutene isoprene rubber (IIR), natural rubber (NR) or ethylene propylene diene rubber (EPDM), preferably styrene butadiene rubber or ethylene propylene diene rubber, pure, or in blends, or used as vulcanized rubber mixtures. In this case, vulcanized rubber mixtures are taken to mean mixtures of pure elastomers or elastomer blends or mixtures of elastomers and thermoplastics that are mixed with vulcanization accelerators and/or crosslinkers based on sulfur or peroxide and are vulcanized according to customary practice. Elastomers in this case optionally comprise commercially usual fillers such as carbon black, silica gel, chalk, metal oxides, plasticizers and antioxidants and/or antiozonants. As thermoplastic elastomers, for example, thermoplastic polyurethane (TPU), styrene butadiene styrene (SBS), styrene isoprene styrene (SIS) or comparable polymers can be selected.

Materials according to the invention in addition comprise at least one polyimide (B) which is branched and is selected from condensation products of
(a) at least one polyisocyanate having on average more than two isocyanate groups per molecule, and
(b) at least one polycarboxylic acid having at least 3 COOH groups per molecule or anhydride thereof.

Polyimide (B) can have a molecular weight $M_w$ in the range from 1000 to 200 000 g/mol; preference is given to 2000 g/mol.

Polyimide (B) can have at least two imide groups per molecule; preference is given to at least 3 imide groups per molecule.

In one embodiment of the present invention, polyimide (B) can have up to 1000 imide groups per molecule, preferably up to 660 per molecule.

In one embodiment of the present invention, stating the isocyanate groups or the COOH groups per molecule in each case denotes the mean value (number-average).

Polyimide (B) can be composed of structurally and molecularly uniform molecules. However, preference is given to polyimide (B) being a mixture of molecularly and structurally differing molecules, for example, visible from the polydispersity $M_w/M_n$ of at least 1.4, preferably $M_w/M_n$ of 1.4 to 50, preferably 1.5 to 10. The polydispersity can be determined by known methods, in particular by gel permeation chromatography (GPC). A suitable standard is, for example, poly(methyl methacrylate) (PMMA).

In one embodiment of the present invention, polyimide (B), in addition to imide groups which form the polymer backbone, comprises, terminally or in side chains, in addition at least three, preferably at least six, more preferably at least ten, terminal or side-chain functional groups. Functional groups in polyimide (B) are preferably anhydride or acid groups and/or free or capped NCO groups. Polyimides (B) preferably have no more than 500 terminal or side-chain functional groups, preferably no more than 100.

Alkyl groups such as, for example, methyl groups, are therefore not a branching of a molecule polyimide (B).

Polyisocyanate (a) can be selected from any polyisocyanates that on average have more than two isocyanate groups per molecule, which can be capped or preferably free. Preference is given to trimeric or oligomeric diisocyanates, for example oligomeric hexamethylene diisocyanate, oligomeric isophorone diisocyanate, oligomeric tolylene diisocyanate, oligomeric diphenylmethane diisocyanate—termed polymer-MDI—and mixtures of the abovementioned polyisocyanates. For example, what is termed trimeric hexamethylene diisocyanate, in many cases, is not present as pure trimeric diisocyanate, but as polyisocyanate having a medium functionality of 3.6 to 4 NCO groups per molecule. The same applies to oligomeric tetramethylene diisocyanate and oligomeric isophorone diisocyanate.

In one embodiment of the present invention, polyisocyanate having more than two isocyanate groups per molecule is a mixture of at least one diisocyanate and at least one triisocyanate, or a polyisocyanate having at least 4 isocyanate groups per molecule.

In one embodiment of the present invention, polyisocyanate (a) has on average at least 2.2, preferably on average at least 2.5, particularly preferably on average at least 3.0, isocyanate groups per molecule.

In one embodiment of the present invention, polyisocyanate (a) has on average a maximum of 8, preferably on average a maximum of 6 isocyanate groups per molecule.

In one embodiment of the present invention, polyisocyanate (a) is selected from oligomeric hexamethylene diisocyanate, oligomeric isophorone diisocyanate, oligomeric diphenylmethane diisocyanate, and mixtures of the abovementioned polyisocyanates.

Polyisocyanate (a) can, in addition to urethane groups, also have one or more other functional groups, for example urea, allophanate, biuret, carbodiimide, amide, ester, ether, uretonimine, uretdione, isocyanurate or oxazolidine groups.

As polycarboxylic acids (b), aliphatic, or preferably aromatic, polycarboxylic acids are selected that have at least three COOH groups per molecule, or the respective anhydrides, preferably if they are present in low-molecular weight, that is to say non-polymeric, form. Such polycarboxylic acids having three COOH groups in which two carboxylic acids groups are present as anhydride and the third as a free carboxylic acid are also comprised.

In a preferred embodiment of the present invention, as polycarboxylic acid (o), a polycarboxylic acid having at least 4 COOH groups per molecule, or the respective anhydride, is selected.

Examples of polycarboxylic acids (b) and anhydrides thereof are 1,2,3-benzenetricarboxylic acid and 1,2,3-benzenetricarboxylic dianhydride, 1,3,5-benzenetricarboxylic acid (trimesic acid), preferably 1,2,4-benzenetricarboxylic acid (trimellitic acid), trimellitic anhydride and, in particular, 1,2,4,5-benzenetetracarboxylic acid (pyromellitic acid) and 1,2,4,5-benzenetetracarboxylic dianhydride (pyromellitic dianhydride), 3,3',4,4"-benzophenonetetracarboxylic acid, 3,3',4,4"-benzophenonetetracarboxylic dianhydride, in addition benzenehexacarboxylic acid (mellitic acid) and anhydrides of mellitic acid.

Other suitable polycarboxylic acids (b) and anhydrides thereof are mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3,3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracaboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalenetetracarboxylic dianhydride, 4,8-dimethyl-1,2,3,5,6,7-hexahydronaphthalene-1,2,5,6-tetracarboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanthrenetetracarboxylic acid and 1,3,9,10-phenanthrenetetracarboxylic dianhydride, 3,4,9,10-perylenetetracarboxylic acid and 3,4,9,10-perylenetetracarboxylic dianhydride, bis(2,3-dicarboxyphenyl)methane and bis(2,3-dicarboxyphenyl)methane dianhydride, bis(3,4-dicarboxyphenyl)methane and bis(3,4-dicarboxyphenyl)methane dianhydride, 1,1-bis(2,3-dicarboxyphenyl)ethane and 1,1-bis(2,3-dicarboxyphenyl)ethane dianhydride, 1,1-bis(3,4-dicarboxyphenyl)ethane and 1,1-bis(3,4-dicarboxyphenyl)ethane dianhydride, 2,2-bis(2,3-dicarboxyphenyl)propane and 2,2-bis(2,3-dicarboxyphenyl)propane dianhydride, 2,3-bis(3,4-dicarboxyphenyl)propane and 2,3-bis(3,4-dicarboxyphenyl)propane dianhydride, bis(3,4-carboxyphenyl)sulfone and bis(3,4-carboxyphenyl)sulfone dianhydride, bis(3,4-carboxyphenyl) ether and bis(3,4-carboxyphenyl) ether dianhydride, ethylenetetracarboxylic acid and ethylenetetracarboxylic dianhydride, 1,2,3,4-butanetetracarboxylic acid and 1,2,3,4-butanetetracarboxylic dianhydride, 1,2,3,4-cyclopentanetetracarboxylic acid and 1,2,3,4,-cyclopentanetetracarboxylic dianhydride, 2,3,4,5-pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic; acid and 2,3,4,5-thiophenetetracarboxylic dianhydride.

In one embodiment of the present invention, anhydrides from U.S. Pat. No. 2,155,687 or U.S. Pat. No. 3,277,117 are used for synthesizing polyimide (B).

If polyisocyanate (a) and polycarboxylic acid (b) are condensed with one another—preferably in the presence of a catalyst—an imide group is formed with the elimination of $CO_2$ and $H_2O$. If, instead of polycarboxylic acid (b), the corresponding anhydride is used, an imide group is formed with elimination of $CO_2$.

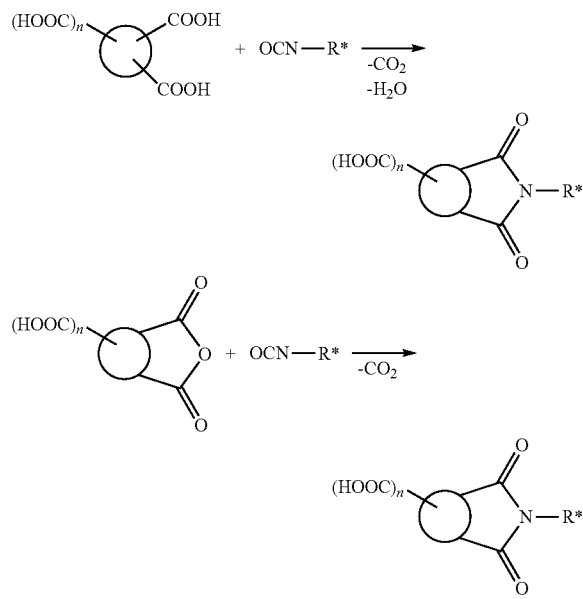

In these formulae R* is the polyisocyanate (a) radical that is not specified further in the above reaction equation, and n is a number greater than or equal to 1, for example 1 in the case of a tricarboxylic acid or 2 in the case of a tetracarboxylic acid. Optionally, $(HOOC)_n$ can be replaced with a C(=O)—O—C(=O) moiety.

In an embodiment of the present invention, polyisocyanate (a) is used in a mixture with at least one diisocyanate, for example with tolylene diisocyanate, hexamethylene diisocyanate or with isophorone diisocyanate. In a particular variant, polyisocyanate (a) is used in a mixture with the corresponding diisocyanate, for example trimeric HDI with hexamethylene diisocyanate or trimeric isophorone diisocyanate with isophorone diisocyanate or polymeric diphenylmethane diisocyanate (polymer MDI) with diphenylmethane diisocyanate.

In one embodiment of the present invention, polycarboxylic acid (b) is used in a mixture with at least one dicarboxylic acid or with at least one dicarboxylic anhydride, for example with phthalic acid or phthalic anhydride.

In one embodiment of the present invention, material according to the invention, in addition can comprise (C) at least one polyurethane, in the context of the present invention, also termed polyurethane (C).

In the context of the present invention, polyurethanes (C) can be chosen from any polyurethanes. Polyurethanes (C) can have a density in the range from 10 g/l to 1200 g/l and comprise foamed and compact systems.

Polyurethanes (C), in the context of the present invention, are taken to mean not only those polymers which are solely linked by urethane groups but, in a general meaning, polymers which can be obtained by reacting di- or polyisocyanates with diols and with other compounds that comprise at least two active hydrogen atoms per molecule. Polyurethanes (C) can therefore, in addition to urethane groups, comprise, for example, urea, allophanate, biuret, carbodiimide, amide, ester, ether, uretonimine, uretdione, isocyanurate or oxazolidine groups.

In one embodiment of the present invention, polyurethane (C) comprises at least 50% by weight, preferably at least 80% by weight, and in particular at least 95% by weight of a prepolymer having isocyanate groups, hereinafter termed isocyanate prepolymer.

In one embodiment of the present invention, polyurethane (C) comprises on average at least two isocyanate groups per molecule, preferably on average 2 to 3 isocyanate groups per molecule.

The viscosity of polyurethane (C) is preferably in a range from 500 to 10 000 mPa·s, particularly preferably from 1000 to 5000 mPa·s, measured at 25° C. as spec fled in DIN 53 018.

Polyurethane (C) can be produced in this case by reacting di- and polyisocyanates with compounds reactive to isocyanates, chain extenders and/or crosslinkers, wherein polyisocyanate is used in excess.

Di- and polyisocyanates can be selected from aliphatic, cycloaliphatic and aromatic divalent or polyvalent di- and polyisocyanates and also any mixtures thereof. Preference is given to 4,4',2,4' and 2,2'-diphenylmethane diisocyanate, in particular mixtures of 2,4'-diphenylmethane diisocyanate and 4,4'-diphenylmethane diisocyanate, mixtures of monomeric diphenylmethane diisocyanates and relatively high-nuclear homologues of diphenylmethane diisocyanate (polymer-MDI), tetramethylene diisocyanate, hexamethylene diisocyanate (HD), isophorone diisocyanate (IPDI), 1,4-phenylene diisocyanate, 1,5-naphthalene diisocyanate (ND), 2,4,6-toluene triisocyanate and 2,4- and 2,6-tolylene diisocyanate (TDI), or mixtures thereof.

Very particularly preferably, 2,4-tolylene diisocyanate, 2,6-tolylene diisocyanate, 2,4'-diphenylmethane diisocyanate and 4,4'-diphenylmethane diisocyanate and high-nuclear homologues of diphenylmethane diisocyanate (polymer-MDI) and also mixtures of the abovementioned di- and polyisocyanates, free or, for example, blocked as uretonimine, in particular a mixture of 2,4'-diphenylmethane diisocyanate and 4,4'-diphenylmethane diisocyanate, are selected as polyisocyanate.

In an embodiment of the present invention, mixtures of two or more diisocyanates are incorporated in polyurethane (C), for example at least two aromatic diisocyanates, or at last two aliphatic diisocyanates, or at least one aliphatic diisocyanate and at least one cycloaliphatic diisocyanate, or at least one aromatic diisocyanate and at least one aliphatic diisocyanate, or at least one aromatic diisocyanate and at least one cycloaliphatic diisocyanate.

As compounds that are reactive to isocyanates, all compounds having at least two active hydrogen atoms, i.e. two hydrogen atoms that are reactive to isocyanate groups, can be used. Suitable compounds which comprise at least two active hydrogen atoms per molecule are amino alcohols, thioglycols, diamines and, in particular, low-molecular-weight and polymeric diols.

Low-molecular-weight diols which may be mentioned in the context of the present invention are those having a molecular weight up to 500 g/mol, for example: 2-ethanediol, 1,2-propanediol, 1,3-propanediol, 1,2-butanediol, 1,3-butanediol, 1,4-butanediol, 1,4-but-2-enediol, 1,4-but-2-inediol, 1,5-pentanediol and positional isomers thereof, 1,6-hexanediol, 1,8-octanediol, 1,4-bishydroxymethylcyclohexane, 2,2-bis(4-hydroxycyclohexyl)propane, 2-methyl-1,3-propanediol, diethylene glycol, triethylene glycol, tetraethylene glycol and, in particular, 2,2-dimethylpropane-1,3-diol (neopentyl glycol).

Polymeric diols which may be mentioned are dihydric or polyhydric polyester polyols and polyether polyols, wherein preference is given to dihydric. As polyether polyols, preferably polyether diols come into consideration, as are obtainable, for example, by boron trifluoride-catalyzed linking of ethylene oxide, propylene oxide, butylerie oxide, tetrahydrofuran, styrene oxide or epichlorohydrin with themselves or among one another or by addition of these compounds, alone or in a mixture, to starter components having reactive hydrogen atoms such as water, polyhydric alcohols or amines such as 1,2-ethanediol, 1,3-propanediol, 1,2- or 2,2-bis(4-hydroxyphenyl)propane or aniline. In addition, polymeric diols that are preferably used are polyether 1,3-diols, for example trimethylolpropane alkoxylated on an OH group, the alkylene oxide chain of which is terminated with an alkyl radical comprising 1 to 18 carbon atoms.

Preferred polymeric diols are: polyethylene glycol, polypropylene glycol and polytetrahydrofuran (poly-THF).

Particularly preferably, polyether polyols are selected from: polyethylene glycol having a median molecular weight ($M_n$) in the range from 500 to 9000 g/mol, preferably in the range from 500 to 6000 g/mol, poly-1,2-propylene glycol or poly-1,3-propane diol having a median molecular weight ($M_n$) in the range from 500 to 6000 g/mol, preferably 600 to 4000 g/mol, poly-THF having a median molecular weight ($M_n$) in the range from above 500 to 5000 g/mol, preferably from 600 to 3000 g/mol, particularly preferably in the range from 750 to 2500 g/mol.

Other preferred polymeric diols are polyester polyols (polyester diols) and polycarbonate diols.

In an embodiment of the present invention, polyurethane (C) is made up by reading di- or polyisocyanate with di-, tri- or higher-functional polyether polyols, in particular with those which have one or more tertiary amino groups.

Polyether polyols that have tertiary amino groups can be obtained, for example, by reacting secondary amines such as, for example, ethylenediamine with alkylene oxides, for example ethylene oxide or propylene oxide.

Preferred polyether polyols, particularly preferably polyoxypropylene polyols or polyoxypropylene polyoxyethylene polyols, have a functionality of 2 to 5, particularly preferably of 2 to 3, and molecular weights $M_w$ in the range from 400 to 9000, preferably 1000 to 6000, particularly preferably 1500 to 5000, and in particular from 2000 to 4000 g/mol. A very particularly preferred polyether polyol is polypropylene glycol having a weight-average molecular weight in the range from 1500 to 2500 g/mol.

Preferably, the content of free monomeric diisocyanates having a molecular weight<249 g/mol in polyurethane (C) is less than 1% by weight, particularly preferably less than 0.5% by weight and, in particular less than 0.1% by weight, based on the total weight of the polyurethane (C). This applies in particular when polyurethane (C) has been produced using tolylene diisocyanate.

Preferably, polyurethane (C) is aromatic polyurethane, that is to say, at leas: 50 mol % of the diisocyanate incorporated is aromatic diisocyanate(s).

In an embodiment of the present invention, a material according to the invention comprises
in the range from 70 to 97% by weight of rubber (A), preferably 80 to 88% by weight,
in the range from 0.5 to 5% by weight of polyimide (B), preferably 3 to 3.5% by weight,
in the range from zero to 25% by weight of polyurethane (C), preferably 3 to 20% by weight.

In an embodiment of the present invention, a material according to the invertion can comprise at least one additive (D), for example organic or inorganic fillers, such as
siliceous minerals, for example talc, sheet silicates such as antigorite, serpentine, in particular chrysotile, in addition amphibole, in particular hornblendes;
metal oxides such as kaolin, aluminum oxides, titanium oxides and iron oxides,
other metal salts, for example carbonates, sulfates and sulfides, in particular chalk, heavy spar, cadmium sulfide and zinc sulfide, and also
glass particles including glass fibers in various dimensions, in addition antioxidants and antiozonants or plasticizers and one or more thermoplastic organic polymers, such as ethylene vinyl acetate (EVA), polyethylene, polypropylene, polycarbonate, thermoplastic polyurethane (TPU), polyvinyl chloride (PVC), or preferably styrene-comprising thermoplastics, for example polystyrene or polystyrene acrylonitrile (SAN), or thermoplastic elastomers based on styrene butadiene styrene block copolymers or styrene isoprene styrene block copolymers or blends of the abovementioned thermoplastics with one another.

Preferably, the additive (D) used is kaolin (China clay), aluminosilicate and co-precipitates of barium sulfate and aluminosilicate, and also natural and synthetic fibrous minerals, such as wollastonite, metal fibers and in particular glass fiters of identical or different length which can optionally be sized.

Organic fillers which come into consideration are, for example: carbon black, melamine, rosin, cyclopentadienyl resins and graft copolymers, in addition cellulose fibers, polyamide, polyacrylonitrile, polyurethane, polyester fibers based on aromatic and/or aliphatic dicarboxylic esters and, in particular, carbon fibers.

In one embodiment of the present invention, a material according to the invention can comprise, in total, in the range from 0.1 to 50% by weight, based on the sum of rubber (A) and polyimide (B) and optionally polyurethane (C), of additive or additives (D).

Materials according to the invention are suitable, particularly, as, or for the production of, shoe soles, tires, laminate, upholstery, car seats, and preferably for producing sports hall floors and playgrounds, for example as floors (shock pads) and, in particular, running tracks, for example as an intermediate layer or subgrade. The present invention further relates to the use of materials according to the invention as, or for producing, shoe soles, tires, laminate, upholstery, car seats. The present invention further relates to shoe soles, tires, laminate, upholstery, car seats comprising at least one material according to the invention. Shoe soles, tires, laminate, upholstery, car seats and sports hall floors and playgrounds and, in particular, running tracks according to the invention, for example as intermediate layer or subgrade, are distinguished by very good mechanical properties, in particular with respect to tensile strength and elongation.

The present invention further relates to a method for producing materials according to the invention, also termed a production method according to the invention. The production method according to the invention is carried out by mixing with one another (A) at least one rubber,
(B) at least one polyimide selected from branched condensation products of
   (a) at least one polyisocyanate having on average more than two isocyanate groups per molecule, and
   (b) at least one polycarboxylic acid having at least 3 COOH groups per molecule or anhydride thereof, and
(C) optionally at least one polyurethane.

Preferably, polyimide (B) has a polydispersity $M_w/M_n$ of at least 1.4.

Polyurethane (C), rubber (A) and polyimide (B) are described above.

Polyurethane (C) can be used in an amount of up to 25% by weight, and in particular 3 to 20% by weight, based on the total mixture of rubber (A) with polyimide (B).

In one embodiment of the present invention, rubber (A) is used as granules. Granular rubber (A) can have any size and shape. Preference is given to use of elastic granules of rubber or plastic wastes. The medium grain diameter of granular rubber (A) can be up to a maximum of 60 mm, preferably from 0.05 to 50 mm, and particularly preferably from 1 to 4 mm, wherein bimodal and multimodal mixtures also come into consideration. Said rubber wastes are formed, for example, in the recycling of car tires, in tire retreading and in the fabrication of industrial rubber or plastic articles. Wastes from the recycling of car tires are preferably used.

In another embodiment of the present invention, rubber (A) is used as fibers.

In one embodiment of the production method according to the invention, a procedure is followed in such a manner that polyimide (B) is applied to a body that comprises rubber (A) and optionally polyurethane (C), in such a manner that, or wherein, a film of polyimide (B) forms. Thereafter, further rubber (A) or polyurethane (C) is introduced and mechanical contact is made. Preferably, compression can be used.

In one embodiment of the present invention, polyimide (B) can be formed in situ on rubber (A), or, optionally, polyurethane (C).

In a special embodiment of the production method according to the invention, a procedure can be followed such that polyurethane (C) is mixed in amounts of up to 25% by weight, preferably 3 to 10 parts by weight, based on the sum of rubber (A) and polyimide (B), with rubber (A) and polyimide (B), optionally with addition of at least one of the abovementioned additives (D), for example in a forced mixer. The resultant mixture is then cured.

The resultant mixture can be cured by adding compounds reactive towards socyanate and/or chain extenders or crosslinkers, in the context of the present invention, also termed a two-step method.

In one embodiment of the present invention, rubber (A) is first mixed with an additive (D), in particular an additive which comprises at least one compound that comprises at least one, preferably at least two, different or preferably identical functional groups which can react with isocyanate. Suitable compounds are primary diamines, primary alkanolamines, for example ethanolamine, secondary dialkanolamines, for example N,N-diethanolamine, and in particular diols, for example ethylene glycol, diethylene glycol, propylene glycol, dipropylene glycol, neopentyl glycol or 1,4-butanediol. Very particularly suitable diols are polymeric diols that are derived from ethylene glycol or propylene glycol and which can have a molecular weight $M_w$ in the range from 1000 to 5000 g/mol.

In one embodiment of the present invention, the above-described additive is mixed with at least one acid, for example with sulfuric acid or, in particular, with phosphoric acid.

Such an additive can considerably improve the curing of a mixture of rubber (A) and polyimide (B) and optionally polyurethane (C), for example accelerate curing or lead to harder products.

Curing the mixture obtained as described above can be e.g. accelerated by adding catalysts customary in polyurethane chemistry, e.g. tertiary amines, and/or organic metal compounds. Catalysts used, are for example, amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, tetramethylhexanediamine, pentamethyldiethylenetriamine, tetramethyl diaminoethyl ether, bis(dimethylaminopropyl)urea, dimethylpiperazine, 1,2-dimethylimidazole, 1-azabicyclo(3,3,0)octane and preferably 1,4-diazabicyclo(2,2,2)octane and alkanolamine compounds, such as triethanolamine, triisopropanolamine, N-methyl- and N-ethyldiethanolamine and dimethylethanolamine. Likewise, metal compounds come into consideration as catalysts, preferably tin compounds such as tin(II) salts of organic carboxylic acids, e.g. tin(II) acetate, tin(II) octoate, tin(II) ethylhexoate and tin(II) laurate and, preferably, organotin compounds, in particular the dialkyltin(IV) salts of organic carboxylic acids, e.g. di-n-butyltin diacetate, di-n-butyltin dilaurate, di-n-butyltin maleate and di-n-octyltin diacetate, and also bismuth carboxylates, such as bismuth(III) neodecanoate, bismuth 2-ethylhexanoate and bismuth octanoate or mixtures thereof. Metal compounds or organometal compounds can be used alone or in combination with basic amines.

As a preferred catalyst, di-n-butyltin mercaptide is used.

The time point when catalyst is added is not critical here. Thus, the catalyst can, for example, be already present in the polyurethane (C) or is added during the mixing with rubber (A).

Preferably, 0.001 to 5% by weight, in particular 0.05 to 2% by weight of catalyst or catalyst combination is added, based on the weight of the components reactive towards isocyanate and optionally a chain extender and/or additive (D).

Rubber (A) can have a grain diameter of $\leqq 60$ mm, preferably of 1 to 4 mm, and/or be added in an amount of 70 to 97% by weight, based on the total composition of the mixture. The grain diameter can be uniform or else widely distributed.

Polyurethane (C) can be used in amount of zero to 25% by weight and in particular 3 to 20% by weight-based on the total composition of the mixture.

The above-described curing should be carried out in a preferred variant embodiment on the substrate on which materials according to the invention are to be used, that is to say on the substrate of the respective playground, the respective running track or a sports hall floor.

The present invention further relates to polyimides having a polydispersity $M_w/M_n$ of at least 1.4, selected from branched condensation products of (a) at least one polyisocyanate having on average more than two isocyanate groups per molecule, termed polyisocyanate (a) for short, and (b) at least one polycarboxylic acid having at least 3 COOH groups per molecule, termed polycarboxylic acid (b) for short, or anhydride thereof termed anhydride (b) for short.

Rubber (A), polyisocyanate (a), polycarboxylic acid (b), anhydride (b) and polyurethane (C) are described above.

In an embodiment of the present invention, polyisocyanate (a) is selected from oligomeric hexamethylene diisocyanate, oligomeric tetramethylene diisocyanate, oligomeric isophorone diisocyanate, oligomeric diphenylmethane diisocyanate, oligomeric tolylene diisocyanate and mixtures of the abovementioned polyisocyanates.

In an embodiment of the present invention, as polycarboxylic acid (b), a polycarboxylic acid having at least 4 COOH groups per molecule, or the respective anhydride, is selected.

Polyimide (B) according to the invention can have a molecular weight $M_w$ in the range from 1000 to 200 000 g/mol, preferably at least 2000 g/mol.

Polyimide (B) according to the invention can have at least two imide groups per molecule, preferably at least 3 imide groups per molecule.

Polyimide (B) according to the invention occurs as a mixture of molecularly and structurally different molecules, apparent from, for example, the polydispersity $M_w/M_n$ of at least 1.4, preferably $M_w/M_n$ of 1.4 to 50, preferably 1.5 to 10.

In an embodiment of the present invention, polyimide (B) according to the invention, in addition to imide groups which form the polymer backbone, has terminally or as side chains, in addition, at least three, preferably at least six, more preferably at least ten, functional groups. Terminal or side-chain functional groups in polyimide (B) according to the invention are preferably anhydride groups or acid groups and/or free or capped NCO groups. Polyimides (B) according to the invention preferably have no more than 500 terminal or side-chain functional groups, preferably no more than 100.

Alkyl groups such as, for example, methyl groups, are therefore not a branching of a polyimide (B) according to the invention.

In an embodiment of the present invention, polyimide (B) according to the invention is a hyperbranched polyimide. "Hyperbranched", in the context of the present invention, is taken to mean that the degree of branching (DB), that is to say the medium lumber of dendritic links plus the medium number of end groups per molecule, divided by the sum of the median number of dendritic, linear and terminal links, multiplied by 100, is 10 to 99.9%, preferably 20 to 99%, particularly preferably 20 to 95%. "Dendrimer", in the context of the present invention, is taken to mean that the degree of branching is 99.9-100%. For the definition of "degree of branching" see H. Frey et al., Acta Polym. 1997, 48, 30.

Polyimides (B) according to the invention are particularly suitable for producing materials according to the invention.

The present invention further relates to a method for producing polyimides according to the invention, also termed a synthesis method according to the invention for short. The synthesis method according to the invention comprises reacting with one another (a) at least one polyisocyanate having on average more than two isocyanate groups per molecule, and (b) at least one polycarboxylic acid having at least 3 COOH groups per molecule or anhydride thereof in the presence of a catalyst.

As catalysts, in particular water and Brønsted bases are suitable, for example alkalimetal alcoholates, in particular alkanolates of sodium or potassium, for example sodium methanolate, sodium ethanolate, sodium phenolate, potassium methanolate, potassium ethanolate, potassium phenolate, lithium methanolate, lithium ethanolate and lithium phenolate.

For carrying out the synthesis method according to the invention, polyisocyanate (a) and polycarboxylic acid (b) or anhydride (b) can be used in a quantitative ratio such that the molar fraction of NCO groups to COOH groups is in the range from 1:3 to 3:1, preferably 1:2 to 2:1. In this case, one anhydride group of the formula CO—O—CO counts as two COOH groups.

In an embodiment of the present invention, catalyst can be used in the range from 0.005 to 0.1% by weight, based on the sum of polyisocyanate (a) and polycarboxylic acid (b) or polyisocyanate (a) and anhydride (b). Preference is given to 0.01 to 0.05% by weight of catalyst.

In an embodiment of the present invention, the synthesis method according to the invention can be carried out at temperatures in the range from 50 to 200° C., preferably 50 to 140° C., particularly preferably 50 to 100° C.

In an embodiment of the present invention, the synthesis method according to the invention can be carried out at atmospheric pressure. However, the synthesis is also possible under pressure, for example at pressures in the range from 1.1 to 10 bar.

In an embodiment of the present invention, the synthesis method according to the invention can be carried out in the presence of a solvent or solvent mixture. Examples of suitable solvents are N-methylpyrrolidone, N-ethylpyrrolidone, dimethylformamide, dimethylacetamide, dimethyl sulfoxide, dimethyl sulphones, xylene, phenol, cresol, ketones such as, for example, acetone, methyl ethyl ketone (MEK), methyl isobutyl ketone (MIBK), acetophenone, in addition mono- and dichlorobenzene, ethylene glycol monoethyl ether acetate and mixtures of two or more of the abovementioned mixtures. In this case, the solvent or solvents can be present during the entire synthesis time or only during part of the synthesis.

The reaction can be carried out, for example, for a time period of 10 minutes to 24 hours.

In a preferred embodiment of the present invention, the synthesis method according to the invention is carried out under inert gas, for example under argon or under nitrogen.

If water-sensitive Brønsted base is used as catalyst, it is preferred to dry inert gas and solvent. If water is used as catalyst, the drying of solvent and inert gas can be dispensed with.

In a variant of the synthesis method according to the invention, NCO end groups of polyimide (B) according to the invention can be blocked with secondary amine (c), for example with dimethylamine, di-n-butylamine or with diethylamine.

The invention will be illustrated by working examples.

WORKING EXAMPLES

General Notes:
Polyisocyanate (a.1): Polymeric 4,4'-diphenylmethane diisocyanate ("polymer-MDI"), 2.7 isocyanate groups per molecule, viscosity: 195 mPa·s at 25° C., commercially available as Lupranat® M20 W
Polyisocyanate (a.2): Isocyanurate of hexamethylene diisocyanate, on average 3.6 isocyanate groups per molecule, commercially available as Basonat® HI
Anhydride (b.1): 1,2,4,5-Benzenetetracarboxylic anhydride
Secondary amine (c.1): n-Butylamine The molecular weights were determined by gel permeation chromatography (GPC using a refractometer as detector). The standard used was polymethyl methacrylate (PMMA). The solvent used was N,N-dimethylacetamide (DMAc), unless explicitly stated otherwise.

The NCO content was determined titrimetrically as specified in DIN EN ISO 11 909 and reported in % by weight.

The syntheses were carried out under nitrogen, unless described otherwise. When sodium methanolate was used as catalyst, dry nitrogen was selected.

SYNTHESIS EXAMPLES

I. Production of Polyimides (B) According to the Invention
I.1 Synthesis of Polyimide (B.1) According to the Invention
100 g of anhydride (b.1) (0.46 mol), dissolved in 1400 ml of acetone, were placed in a 4 l four-neck flask having a dropping funnel, reflux condenser, internal thermometer and Teflon stirrer, and 0.1 g of water was added. Then, 400 g (1.19 mol) of polyisocyanate (a.1) were added dropwise at 20° C. The mixture was heated with stirring to 55° C. The mixture was stirred for a further six hours under reflux at 55° C. The molecular weight and the NCO content were determined from an aliquot.
$M_n$=3300 g/mol, $M_w$=4820 g/mol
$M_w/M_n$=1.5
NCO=27.8%

The product was diluted by adding 350 g of a 1:1 mixture of 2,4'-diphenylmethane diisocyanate and 4,4'-diphenylmethane diisocyanate. The acetone was then distilled off at atmospheric pressure over a period of one hour. Towards the end of the distillation, the residue was stripped with nitrogen at 70° C. and 200 mbar. Polyimide (B.1) according to the invention was obtained.
Analytical Data:
$M_n$=2380 g/mol, $M_w$=3000 g/mol, $M_w/M_n$=1.3
NCO: 29.4%
I.2 Synthesis of Polyimide (B.2) According to the Invention
33 g of anhydride (b.1) (0.15 mol), dissolved in 467 g of acetone, were placed in a 1 l four-neck flask having a dropping funnel, reflux condenser, internal thermometer and Teflon stirrer, and 0.05 g of water was added. Then, 50 g (0.075 mol) of polyisocyanate (a.2) were added dropwise at 20° C. The mixture was heated with stirring to 55° C. and was stirred for six hours under reflux at 55° C. Then the product was cooled to room temperature. This produced polyimide (B.2) according to the invention.
I.3 Synthesis of Polyimide (B.3) According to the Invention
100 g of anhydride (b.1) (0.46 mol), dissolved in 300 g of N-methylpyrrolidorie (NMP), were placed in a 2 l four-neck flask having a dropping funnel, reflux condenser, internal thermometer and Teflon stirrer, and 0.1 g of water was added. The mixture was heated with stirring to 80° C. Then, 142 g (0.22 mol) of polyisocyanate (a.2) were added dropwise at 80° C. over a time period of six hours. The mixture was stirred for a further ten hours at 80° C. The product was then cooled to room temperature. This produced polyimide (B.3) according to the invention.
I.4 Synthesis of Polyimide (B.4) According to the Invention
100 g of anhydride (b.1) (0.46 mol), dissolved in 300 g of N-methylpyrrolidone (NMP), were placed in a 2 l four-neck flask having a dropping funnel, reflux condenser, internal thermometer and Teflon stirrer, and 0.05 g of water was added. The mixture was heated with stirring to 80° C. Then, 75.8 g (0.11 mol) of polyisocyanate (a.2) were then added dropwise at 80° C. over a time period of one hour. The mixture was stirred for a further four hours at 80° C. 38 g (0.11 mol) of polyisocyanate (a.1) were then added dropwise at 80° C. over a time period of one hour. The mixture was stirred for a further four hours at 80° C. The product was then cooled to room temperature. This produced polyimide (B.41) according to the invention.
NCO: 7.92%
I.5 Synthesis of Polyimide (B.5) According to the Invention
100 g of anhydride (b.1) (0.46 mol), dissolved in 300 g of N-methylpyrrolidone (NMP) were placed in a 2 l four-neck flask having a dropping funnel, reflux condensor, internal thermometer and Teflon stirrer, and 0.1 g of $NaOCH_3$ were added. The mixture was heated with stirring to 80° C. Then, 142.3 g (0.21 mol) of polyisocyanate (a.2) were added dropwise at 80° C. over a time period of one hour. The mixture was stirred for a further ten hours at 80° C. The mixture was then cooled to room temperature. This produced polyimide (B.5) according to the invention.

The NCO content was determined as 6.8% from an aliquot. Then, at room temperature, 117 g of di-n-butylamine (c.1) were added dropwise over a time period of one hour, and the mixture was stirred for a further two hours.

The molecular weight was determined from one aliquot:
$M_n$: 5820 g/mol, $M_w$: 57 900 g/mol, $M_w/M_n$: 10.
II. Production of Materials According to the Invention
Materials Used:
Rubber (A.1): Recycled rubber granules from Alfredo Mesalles, S. A. (Gayá, Barcelona, Spain), particle diameter in the range of 1 to 4 mm.
Polyurethane (C.1): Isocyanate-terminated prepolymer of 18% by weight of 4,4'-MDI, 13% by weight of 2,4'-MDI, 1% by weight of 2,2'-MDI and 68% by weight of a polyether diol (EO/PO) having a molecular weight $M_w$ of 4000 g/mol and an OH number of 56 mg KOH/g
NCO content of the prepolymer of 8% by weight.
Additive (D.1): Mixture of a polypropylene oxide having a molecular weight $M_w$ of 2000 g/mol and aqueous phosphoric acid (85% by weight) in the weight ratio 95:5 (comparison).
Component A2: Mixture of polyurethane (C.1) and polyimide (B.1) according to the invention in the weight ratio of 80:20.
II.1 Production of V-PP.1 Test Slabs (One-Step Method, Comparison)

In a polypropylene vessel, a mixture of rubber (A.1) having a grain size of 1 to 4 mm was mixed with the amount of polyurethane (C.1) stated in table 1 using a Vollrath stirrer (stirrer diameter: 8.5 cm, stirrer speed: 750 revolutions per minute, stirring time: 2 minutes), until the rubber particles were uniformly wetted, as was determined by visual inspection. The mixture was then charged into a wooden frame of dimensions 20 cm×20 cm×1.5 cm (in each case internal dimensions). This produced V-PP.1 test slabs which were cured for 7 days at room temperature and 50% relative humidity and were then measured.

ISO 1798 using dumbbell specimens of a bridge width of 25 mm and a displacement rate of 100 mm/min.

Results

TABLE 1

| | Production of test slabs | | | | | | |
|---|---|---|---|---|---|---|---|
| | | | | (C.1) | (C.1) and (B) [parts by weight] | | |
| | Rubber | (D.1) | | | 2nd step | Tensile | |
| No. | [parts by weight] (A.1) | [parts by weight] | 1st step (C.1) | (C.1) and (B.1) 4:1 | (C.1) and (B.2) 4:1 | strength [kPa] | Elongation [%] |
| V-PP.1 | 100 | — | 20 | — | — | 136 = 10 | 22 ± 5 |
| PP.2 | 100 | — | 16 | — | 4 | 266 = 10 | 25 ± 5 |
| V-PP.3 | 100 | 1 | 19 | — | — | 226 = 10 | 41 ± 5 |
| PP.4 | 100 | 1 | 15.2 | 3.8 | — | 277 = 10 | 38 ± 5 |

II.2 Production According to the Invention of PP.2 Test Slabs (One-Step Method)

In a polypropylene container, a mixture of rubber (A.1) was mixed with the amount of component A2 stated in table 1 using a Vollrath stirrer (stirrer diameter: 8.5 cm, stirrer speed: 750 revolutions per minute, stirring time: 2 minutes), until the rubber particles were uniformly wetted, as was determined by visual inspection. The resultant mixture was then charged into a wooden frame of dimensions 20 cm×20 cm×1.5 cm (in each case internal dimensions). This produced PP.2 test slabs according to the invention which were cured for 7 days at room temperature and 50% relative humidity and subsequently measured.

II.3 Production of P.3 Test Slabs (Two-Step Method, Comparison)

In a polypropylene container, a mixture of rubber (A.1) was mixed with the amount of additive (D.1) stated in table 1 with a Vollrath stirrer (stirrer diameter: 8.5 cm, stirrer speed: 750 revolutions per minute, stirring time: 2 minutes), until the rubber particles were uniformly wetted. Polyurethane (C.1) was then added. Mixing was continued until a uniform coating of the rubber particles with polyurethane (A.1) was achieved, as determined by visual inspection. The mixture was then charged into a wooden frame of dimensions 20 cm×20 cm×1.5 cm (in each case internal dimensions). This produced V-PP.3 test slabs which were cured for 7 days at room temperature and 50% relative humidity and then measured.

II.4 Production According to the Invention of Test Slabs (Two-Step Method)

In a polypropylene container, a mixture of rubber (A.1) was mixed with the amount stated in table 1 of additive (D.1) using a Vollrath stirrer (stirrer diameter: 8.5 cm, stirrer speed: 750 rotations per minute, stirring time: 2 minutes) until the rubber particles were uniformly wetted. Component A2 was then added, and the mixture was again mixed until uniform coating of the rubber particles with component A2 had been achieved, as was determined by visual inspection. The resultant mixture was then charged into a wooden frame of dimensions 20 cm×20 cm×1.5 cm (in each case internal dimensions). This produced PP.4 test slabs according to the invention which were cured for 7 days at room temperature and 50% relative humidity and then measured.

Test Methods

Tension/elongation measurements: Tensile strength and elongation at break were determined on the basis of DIN EN

The invention claimed is:

1. A material comprising
   (A) at least one rubber, and
   (B) at least one polyimide selected from branched condensation products of
      (a) at least one polyisocyanate having on average more than two isocyanate groups per molecule, and
      (b) at least one polycarboxylic acid having at least 3 COOH groups per molecule or anhydride thereof.

2. The material according to claim 1, wherein polyimide (B) has a molecular weight $M_w$ of at least 1000 g/mol.

3. The material according to claim 1, wherein polycarboxylic acid (b) is a polycarboxylic acid having at least 4 COOH groups per molecule, or anhydride thereof.

4. The material according to claim 1, wherein polyisocyanate (a) is selected from the group consisting of oligomeric hexamethylene diisocyanate, oligomeric tetramethylene diisocyanate, oligomeric isophorone diisocyanate, oligomeric diphenylmethane diisocyanate, trimeric tolylene diisocyanate and mixtures thereof.

5. The material according to claim 1, further comprising (C) at least one polyurethane.

6. The material according to claim 5, wherein polyurethane (C) is one or more aromatic polyurethanes.

7. The material according to claim 1, wherein rubber (A) is selected from the group consisting of butadiene rubber (BR), styrene butadiene rubber (SBR), isoprene rubber (IR), styrene isoprene butadiene rubber (SIBR), acrylonitrile butadiene rubber (NBR), chloroprene rubber (CR), isobutene isoprene rubber (IIR), ethylene propylene diene rubber (EPDM), natural rubber (NR) and mixtures thereof.

8. The material according to claim 1, wherein polyimide (B) has a polydispersity $M_w/M_n$ of at least 1.4.

9. The material according to claim 1, further comprising at least one additive (D) which comprises at least one acid and at least one compound having two functional groups that can react with isocyanate.

10. A method for producing the material according to claim 1, which comprises, mixing with one another
   (A) at least one rubber,
   (B) at least one polyimide selected from branched condensation products of
      (a) at least one polyisocyanate having on average more than two isocyanate groups per molecule, and
      (b) at least one polycarboxylic acid having at least 3 COOH groups per molecule or anhydride thereof, and
   (C) optionally at least one polyurethane.

11. The method according to claim 10, wherein polyimide (B) has a polydispersity $M_w/M_n$ of at least 1.4.

12. A polyimide having a polydispersity $M_w/M_n$ of at least 1.4, selected from branched condensation products of
   (a) at least one polyisocyanate having on average more than two isocyanate groups per molecule and
   (b) at least one polycarboxylic acid having at least 3 COOH groups per molecule or anhydride thereof.

13. The polyimide according to claim 12, wherein polyisocyanate (a) is selected from the group consisting of oligomeric hexamethylene diisocyanate, oligomeric tetramethylene diisocyanate, oligomeric isophorone diisocyanate, oligomeric diphenylmethane diisocyanate, trimeric tolylene diisocyanate and mixtures thereof.

14. The polyimide according to claim 12, wherein polycarboxylic acid (b) is a polycarboxylic acid having at least 4 COOH groups per molecule, or anhydride thereof.

15. A method for producing the polyimide according to claim 12, which comprises
   reacting with one another
   (a) the at least one polyisocyanate having on average more than two isocyanate groups per molecule, and
   (b) the at least one polycarboxylic acid having at least 3 COOH groups per molecule or anhydride thereof
   in the presence of a catalyst.

16. The method according to claim 15, wherein the catalyst is water or a Bronsted base.

\* \* \* \* \*